United States Patent Office 2,753,353
Patented July 3, 1956

2,753,353

DERIVATIVES OF ISONICOTINIC ACID HYDRAZIDE

Jack Bernstein and Kathryn A. Losee, New Brunswick, N. J., assignors to Olin Mathieson Chemical Corporation, New York, N. Y., a corporation of Virginia No Drawing. Original application January 14, 1953, Serial No. 331,324. Divided and this application February 2, 1956, Serial No. 562,944

6 Claims. (Cl. 260—295)

The application is a division of our parent application, Serial No. 331,324, filed January 14, 1953.

This invention relates to, and has for its object, the provision of certain α-hydroxy-substituted isonicotinoyl hydrazines, acid-addition salts of such substituted hydrazines and methods for their prepartaion. These compounds are valuable chemotherapeutic agents, having antimycobacterial (especially antituberculous) properties.

The compounds of this invention (in free-base form) are of the general formula

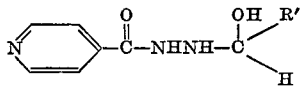

wherein R' is a member of the group consisting of —CCl₃ and —CBr₃. That is, the compounds of this invention are those of the above formula wherein

represents the residue of chloral or bromal.

These compounds may be prepared by reacting isonicotinic acid hydrazide with a carbonyl-containing reactant, such as chloral or bromal, and isolating the product from the reaction mixture.

Acid-addition salts of the bases of this invention may be prepared by treatment with an acid in an inert medium. Thus, hydrochlorides may be prepared by adding ethereal hydrogen chloride to a solution of the compound in an inert solvent (e. g., acetonitrile, absolute methanol, absolute ethanol, isopropanol, methyl ethyl ketone, n-butanol, etc.), and then separating the acid-addition salt which forms. Similarly, other salts, such as those of sulfuric acid, phosphoric acid, p-aminosalicylic acid, p-toluenesulfonic acid, methionine, sulfamic acid, lactic acid, citric acid, gluconic acid, etc., may be formed.

As to reaction conditions, wide variation is permissible. While it is preferable to have an excess of the carbonyl-containing reactant in the reaction medium stoichiometric amounts of reactants may be used, or the hydrazide may be present in excess.

The compounds of this invention are especially useful as chemotherapeutic agents, e. g., in the treatment of tuberculosis or leprosy, their antimycobacterial activity being high, and their toxicity being remarkably low. Thus, the maximum acceptable level in the diet is about 0.15% for N-isonicotinoyl-N'-(1-hydroxy-2,2,2-trichloroethyl)-hydrazine, as compared with about 0.032% for isonicotinic acid hydrazide, an accepted antituberculous agent.

The compounds of this invention may be prepared for use by association of a therapeutically active quantity (at least 0.1%) of the compound with a carrier, which may be a solid material, a sterile liquid vehicle, or a liquid pharmaceutical carrier (such as a syrup). Thus, the formulations may take the form of tablets, powder packets, capsules, or other dosage-unit forms which are useful for oral administration. These may be prepared in the conventional manner. For example, two-piece gelatin capsules may be made containing a mixture of the compound and excipient (e. g., starch, talc, stearic acid, magnesium stearate), the compound being present in an amount of the order of about 10 to 100 mg. or more. Also, one-piece gelatin capsules may be prepared containing the desired dosage (e. g., of the order of 10 to 100 mg. or more) of the agent in sufficient corn oil to render the compound capsulatable. Tablets may be prepared to contain of the order of 10 to 250 mg. or more of the agent, using starch, lactose or other conventional excipient, and the tablets may be scored to enable one to take fractional dosages, if desired. Any of the tableting materials used in pharmaceutical practice may be employed where there is no incompatibility with the particular compound.

The compounds of this invention may also be provided in liquid (solution or suspension) form. Thus, a composition may be prepared to contain about 5 mg. or more of the agent per ml. of liquid pharmaceutical carrier, such as a carbohydrate-containing syrup or an aqueous-alcoholic vehicle; or a sterile parenteral solution may be prepared, for example, by dissolving the agent in water (e. g., about 100 mg./ml.), adding a preservative, such as chlorbutanol (5 mg./ml.), and then ampuling or packaging in multidose vials and sterilizing.

In all compositions where such excipient as lactose is used, sugar-alcohols, such as sorbitol or mannitol, may be substituted.

In addition to their use in human therapy, the compounds of this invention may be used with similar therapeutic effect in animals, such as poultry and cows. For such use, they may take the form of animal feed compositions, such as poultry feed compositions containing at least 0.1% of the compound and a significant amount of nutritive material.

Following are specific working examples illustrating, but not limiting, this invention:

*Example 1*

To a solution of 13.7 g. isonicotinic acid hydrazide in 200 ml. water is added 14.7 g. trichlorethanal, and the resulting mixture is shaken periodically for about 10 minutes. The crystalline precipitate which forms is separated by filtration to yield the crude N-isonicotinoyl-N'-(1-hydroxy-2-trichloroethyl)-hydrazine, which is purified (m. p. 124–125° C.) by recrystallization from 300 ml. water.

*Example 2*

Using the procedure of Example 1, except that 28.1 g. tribromethanal is substituted for the trichlorethanal, N-isonicotinoyl-N'-(1-hydroxy-2-tribromethyl)-hydrazine is obtained.

This invention may be variously otherwise embodied within the scope of the appended claims.

We claim:

1. A member of the group consisting of compounds having the general formula

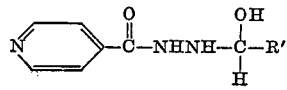

and acid-addition salts thereof, wherein R′ is a member of the group consisting of —CCl₃ and —CBr₃.

2. N-isonicotinoyl-N′-(1-hydroxy-2-trichloroethyl)-hydrazine.

3. N-isonicotinoyl-N′-(1-hydroxy-2-tribromoethyl)-hydrazine.

4. The method which comprises reacting isonicotinic acid hydrazide with a carbonyl compound of the group consisting of chloral and bromal, and isolating the resulting α-hydroxy-substituted hydrazine from the reaction medium.

5. The process of claim 4, wherein the carbonyl compound is chloral.

6. The process of claim 4, wherein the carbonyl compound is bromal.

No references cited.